(12) United States Patent
Lauber et al.

(10) Patent No.: US 11,774,371 B2
(45) Date of Patent: Oct. 3, 2023

(54) DEFECT SIZE MEASUREMENT USING DEEP LEARNING METHODS

(71) Applicant: KLA Corporation, Milpitas, CA (US)

(72) Inventors: Jan Lauber, San Francisco, CA (US); Jason Kirkwood, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 235 days.

(21) Appl. No.: 16/881,083

(22) Filed: May 22, 2020

(65) Prior Publication Data

US 2021/0364450 A1    Nov. 25, 2021

(51) Int. Cl.
| | |
|---|---|
| *G01N 21/95* | (2006.01) |
| *G06T 7/00* | (2017.01) |
| *G06T 11/60* | (2006.01) |
| *G06T 5/50* | (2006.01) |

(52) U.S. Cl.
CPC ........... *G01N 21/9501* (2013.01); *G06T 5/50* (2013.01); *G06T 7/0004* (2013.01); *G06T 11/60* (2013.01); *G06T 2207/20084* (2013.01); *G06T 2207/30148* (2013.01)

(58) Field of Classification Search
CPC ..... G01N 21/9501; G06T 5/50; G06T 7/0004; G06T 11/60; G06T 2207/20084; G06T 2207/30148
See application file for complete search history.

(56) References Cited

U.S. PATENT DOCUMENTS

| | | | |
|---|---|---|---|
| 8,643,833 B1* | 2/2014 | Hung ................. | G01N 21/9501 356/237.1 |
| 2007/0257184 A1* | 11/2007 | Olsen .................. | G02B 3/0075 257/E27.134 |
| 2018/0330511 A1* | 11/2018 | Ha ...................... | G06V 10/7515 |
| 2019/0073566 A1* | 3/2019 | Brauer .................. | G06V 10/82 |
| 2020/0005070 A1 | 1/2020 | Ambikapathi et al. | |
| 2020/0090969 A1 | 3/2020 | Kirkwood et al. | |
| 2020/0143528 A1 | 5/2020 | Kulkarni et al. | |
| 2021/0082566 A1* | 3/2021 | Do ........................ | G06T 7/0012 |

FOREIGN PATENT DOCUMENTS

WO    2019155471 A1    8/2019

OTHER PUBLICATIONS

WIPO, ISR for International Application No. PCT/US2021/032658, dated Aug. 24, 2021.

\* cited by examiner

*Primary Examiner* — Jamil Ahmed
(74) *Attorney, Agent, or Firm* — HODGSON RUSS LLP

(57) ABSTRACT

A system has detectors configured to receive a beam of light reflected from a wafer. For example, three detectors may be used. Each of the detectors is a different channel. Images from the detectors are combined into a pseudo-color RGB image. A convolutional neural network unit (CNN) can receive the pseudo-color RGB image and determine a size of a defect in the pseudo-color RGB image. The CNN also can classify the defect into a size category.

20 Claims, 7 Drawing Sheets

DEFECT SIZE MEASUREMENT USING DEEP LEARNING METHODS

FIELD OF THE DISCLOSURE

This disclosure relates to semiconductor inspection.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer that are separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

The type and size of a defect can be important attributes for semiconductor manufacturers. A size of the defect can have a direct correlation to yield of the semiconductor device being built. Traditional methods estimate the size based on a set of predefined feature vectors, such as magnitude and shape.

Previously, small patch images from all detection channels were saved for each detected defect. In post-processing, feature vectors such as shape or intensity were computed based on these patch images. With the help of these feature vectors, defects were classified into different groups, such as defect type or defect size. Accurate sizing was difficult, however, because many defects are smaller than the wavelength of the light used to probe the device. Furthermore, scattering of the light from a defect is dependent on its shape and the material surrounding it, and such details were not accurately captured in the feature vector approach. Additionally, the sizing results can also depend on the user-defined setup of the feature-vector decision trees being used in the recipe. Therefore, accurate sizing often relies on additional detection on a scanning electron microscope (SEM) tool, which requires use of a separate tool and extra processing time.

This previous technique is slow, imprecise, and has limited uses. Accurate SEM measurements can be costly and time-consuming. Therefore, new semiconductor inspection systems and techniques are needed.

BRIEF SUMMARY OF THE DISCLOSURE

A system is provided in a first embodiment. The system comprises a light source configured to generate a beam of light, at least two detectors configured to receive the beam of light reflected from a wafer, a processor in electronic communication with the detectors, and a convolutional neural network unit. Each of the detectors is a different channel. The processor is configured to combine images from the detectors into a pseudo-color RGB image. The convolutional neural network unit is configured to receive the pseudo-color RGB image from the processor and determine a size of a defect in the pseudo-color RGB image. In an instance, three of the detectors are used.

The convolutional neural network unit can be further configured to classify the defect into one of a plurality of size categories.

The light source can be a laser.

The processor can be configured to combine the images using image overlay.

The processor can be configured to add design images or mask images to the pseudo-color RGB image.

A method is provided in a second embodiment. The method comprises receiving a beam of light reflected from a wafer at a plurality of detectors. The beam of light can be generated with a laser. Using a processor, images from the detectors are combined into a pseudo-color RGB image. The combining can include image overlay. A convolutional neural network unit is used to determine a size of a defect in the pseudo-color RGB image. In an instance, three of the detectors are used. Each detector may be for a different channel.

The convolutional neural network unit can be used to classify the defect into one of a plurality of size categories.

Using the processor, design images or mask images can be added to the pseudo-color RGB image.

In an instance, the defect is smaller than a wavelength of the beam of light.

A non-transitory computer-readable storage medium is provided in a third embodiment. The non-transitory computer-readable storage medium comprises one or more programs for executing steps on one or more computing devices. The steps include combining images of a wafer from a plurality of detectors into a pseudo-color RGB image and determining a size of a defect in the pseudo-color RGB image using a convolutional neural network unit.

The steps can further include classifying the defect into one of a plurality of size categories using the convolution neural network unit.

The combining can include image overlay.

The plurality of detectors can include three of the detectors. Each detector may be for a different channel.

The steps can include adding design images or mask images to the pseudo-color RGB image.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein relate to image classification and measurements using deep-learning methods with convolutional neural networks (CNN). This can be more accurate than previous size measurement. It also can eliminate the need for time-consuming and expensive direct measurements on SEM tools.

Embodiments disclosed herein can combine images from multiple channels into a single pseudo-color RGB image, use a CNN to classify the defects into different size categories, and use a CNN to directly measure the size of a defect. These techniques can improve the size measurement of defects on semiconductor structures. This method is faster than previous techniques because it can be performed in a single imaging path.

Figure 1:
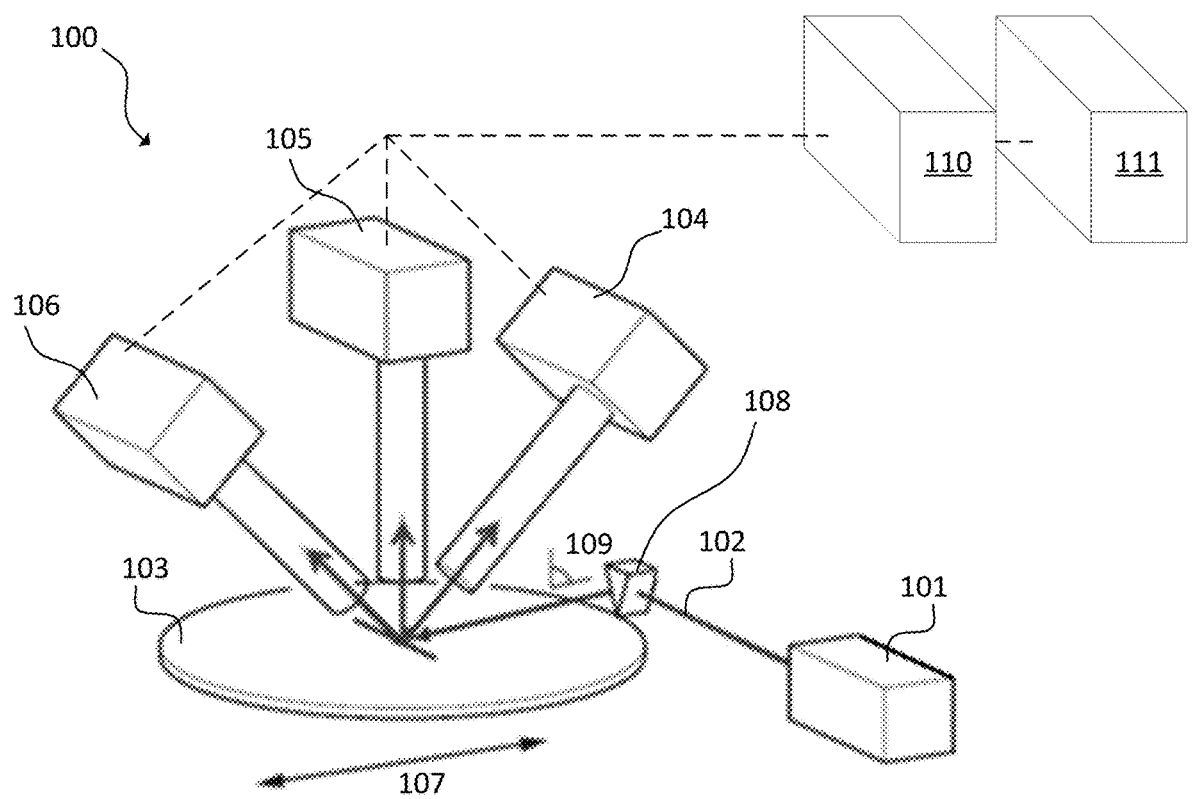
FIG. 1 is an embodiment of a system with three detection channels in accordance with the present disclosure.

FIG. 1 is an embodiment of a system 100 with three detection channels. A light source 101 is configured to generate a beam of light 102. The light source 101 may be a laser, broadband plasma source, or another suitable light source. The light source 101 also can include illumination optics.

In an instance, the light source 101 is a laser. The laser may include any suitable laser known in the art and may be configured to generate light at any suitable wavelength or wavelengths known in the art. For example, visible light, ultraviolet light, or extreme ultraviolet light can be used. In addition, the laser may be configured to generate light that is monochromatic or nearly-monochromatic. In this manner, the laser may be a narrowband laser.

At least two detectors are configured to receive the beam of light 102 reflected from a wafer 103. In the system 100, three detectors 104-106 are illustrated. The detectors 104-106 can each be a camera. Each of the detectors 104-106 is a different channel. Thus, the scattered light from the surface of the wafer 103 can be imaged by two side channels (detectors 104 and 106) and a top-down center channel (detector 105). While three detectors 104-106 are illustrated, other numbers of detectors and channels are possible.

In an embodiment, the three detectors 104-106 include a red channel, a green channel, and a blue channel, but these are merely examples. Other types of channels can be used.

Detectors 104-106 can be any suitable detector known in the art. For example, the detectors 104-106 may include photo-multiplier tubes (PMTs), charge coupled devices (CCDs), time delay integration (TDI) cameras, and any other suitable detectors known in the art. The detectors 104-106 may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor, such as processor 110, may be configured to generate images of the wafer 103 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

The wafer 103 can be moved in the X-direction 107, such as using a stage (not illustrated). Other movement of the wafer 103 is possible. A scanning subsystem for the stage can be configured to cause the light to be scanned over the wafer 103. The scanning subsystem may include any suitable mechanical and/or robotic assembly (that includes the stage) that can be configured to move the wafer 103 such that the light can be scanned over the wafer 103. In addition, or alternatively, the system 100 may be configured such that one or more optical elements can perform some scanning of the light over the wafer 103. The light may be scanned over the wafer 103 in any suitable fashion such as in a serpentine-like path or in a spiral path.

An illumination subsystem can be configured to direct light to wafer 103. The illumination subsystem can be configured to direct the light to the wafer 103 at one or more angles of incidence, which may include one or more oblique angles and/or one or more normal angles. The oblique angle of incidence may include any suitable oblique angle of incidence, which may vary depending on, for instance, characteristics of the wafer 103. For example, an oblique diverter 108 is illustrated, which can generate an angle 109 using the beam of light 102. The angle 109 with respect to normal (vertical) may be 65° or other values.

The beam of light 102 can be directed to the wafer 103 using one or more refractive optical elements, such as a lens. The illumination subsystem may include any other suitable optical elements. Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, one or more of the elements of the illumination subsystem can be altered based on the type of illumination to be used for generating the optical based output.

Each of the detectors 104-106 are in electronic communication with a processor 110. The processor 110 is configured to combine images from the detectors 104-106 into a pseudo-color RGB image. For example, image overlay of the images from the detectors 104-106 can be performed. Each channel can be overlaid to form the RGB image. Multiple images from the detectors 104-106 are combined into the pseudo-color RGB image, which is treated as if it is a traditional RGB image. For example, three images can be combined or an image pair can be combined.

For example, image overlay can be used whereby the image acquired from the channel 1 of the detector 106 is mapped into the R channel of the image, the image from the channel 2 of detector 104 is mapped into the G channel, and the image from the channel 3 of the detector 105 is mapped into the B channel. Likewise, any combination of these images can be mapped into any subsequent image planes. The images passed to the CNN for training may not be limited to RGB, but rather can be any number of dimensions. For example, a fourth image dimension can hold the difference images in the training images.

The processor 110 may be coupled to the components of the system 100 in any suitable manner (e.g., via one or more transmission media, which may include wired and/or wireless transmission media) such that the processor 110 can receive output. The processor 110 may be configured to perform a number of functions using the output. The system 100 can receive instructions or other information from the processor 110. The processor 110 and/or an electronic data storage unit optionally may be in electronic communication with a wafer inspection tool, a wafer metrology tool, or a wafer review tool (not illustrated) to receive additional information or send instructions. For example, the processor 110 and/or the electronic data storage unit can be in electronic communication with an SEM.

The processor 110, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 110 may be disposed in or otherwise part of the system 100 or another device. In an example, the processor 110 may be part of a standalone control unit or in a centralized quality control unit. Multiple processors 110 may be used.

The processor 110 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 110 to implement various methods and functions may be stored in readable storage media.

The processor 110 may be configured to perform a number of functions using the output of the system 100 or other output. For instance, the processor 110 may be configured to send the output to an electronic data storage unit or another storage medium. The processor 110 may be further configured according to any of the embodiments described herein. The processor 110 also may be configured to perform other functions or additional steps using the output of the system 100 or using images or data from other sources.

A CNN unit 111 is operated using the processor 110 or is otherwise connected to the processor 110. For example, the CNN unit 111 can be run on a separate computer with GPU processors for additional performance.

The CNN unit 111 is configured to receive the pseudo-color RGB image from the processor 110. The CNN unit 111 can determine a size of a defect in the pseudo-color RGB image. The CNN unit 111 can review many different attributes of the pseudo-color RGB image to determine the size of the defect. For example, a linear combination of all attributes from the different channels of the detectors can be used by the CNN unit 111 to determine a size of the defect.

While a pseudo-color RGB image used herein can include three channels, it can include information of two channels or more than three channels. Additional channels may improve accuracy, but two or three channels can provide sufficient information to make an accurate size determination. Higher dimensions can combine images of several channels by addition or subtraction. Design images or mask images can be combined into the pseudo-color RGB image, which can be used by the CNN unit 111 for size determination or other classification. The design images or mask images can be added using overlay or other functions.

The CNN unit 111 can be further configured to classify the defect in the pseudo-color RGB image into a size category. For example, the CNN unit 111 can bin by size as determined by the CNN unit 111. The CNN unit 111 also can further classify the defects into types of defects or defect locations.

A CNN trained by deep learning (DL) methods can be well-suited to extract all relevant information directly from the images themselves, which can allow a more accurate estimate of the defect size. With training sets of about 100 examples per size bin, size resolutions of better than 20 nm can be achieved. Because laser-scanning tools like the system 100 collect the images from three separate channels simultaneously, the sizing accuracy of the neural nets built upon the three channel images can be improved by 50% compared to similar systems that support only a single channel.

The CNN may be robust to small changes to the number of training sets per size bin. However, more examples per size bin may provide improved accuracy.

Figure 2:
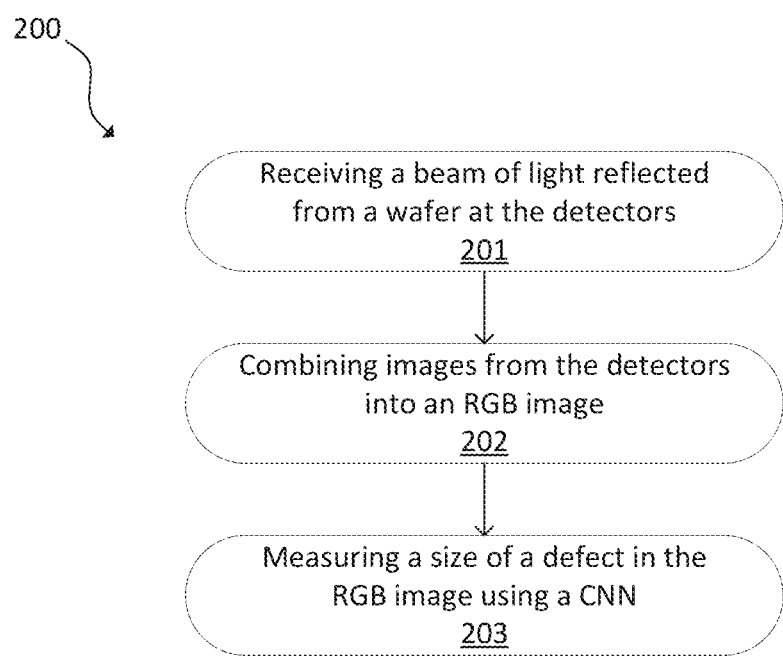
FIG. 2 is a flowchart of a method in accordance with the present disclosure.

FIG. 2 is a flowchart of a method 200, which may use the system 100 of FIG. 1. In the method 200, a beam of light reflected from a wafer is received at two or more detectors at 201. The beam of light may be generated by a laser or other light source. Three detectors may be used in an embodiment. The laser-scanning system can illuminate the wafer to be inspected with a focused laser light while the wafer is moved under the laser light. Scattered light from the surface of the wafer is imaged by the three detectors.

In an instance, a defect is detected by a processor in one or more of the images from the detectors. The processor can detect a defect in an image from one of the channels. Small images of the defects in each of these channels can be saved as a patch image.

The images from the detectors are combined into a pseudo-color RGB image using a processor at 202, such as using image overlay. For example, the patch images from all the channels are combined into the RGB image. The RGB image may be a pseudo-color image (red, green, blue) where each of the color planes corresponds to the images of the channels. Each plane of the image contains the image acquired with one of the different channels. The channels may generate images based on visible or non-visible wavelengths. The imaged object (e.g., defect) can have colors assigned to it in the images of the channels. The colors can be assigned based on intensity values, information in non-visible spectrums, or other techniques. For example, patch images from three channels can be combined into the RGB image. The patch images that are combined can correspond to the same position on the wafer using each of the channels. Images can be aligned with respect to each other so the images all correspond to the same location on the wafer surface. Small variations in the position of the defects within these aligned images can affect the size determination.

A size of a defect in the RGB image is determined using a CNN at 203. The defect may be classified into one of a plurality of size categories using the CNN.

The defects can be sub-wavelength or otherwise smaller than the wavelength of the tool used to detect them. For example, the defects may be a few nanometers to a few microns in size.

While previous tools have difficulty determining a size for these defects, embodiments disclosed herein can use subtle differences about how light scatters off the defects. For example, the differences can include relative intensity values in each of the channels, the exact defect position within each of the channels, the relative extent (i.e., number of pixels) that the defect covers in each of the channels, or other parameters. The CNN can examine the pixels of the defect, pixels around the defect, intensity, and/or the location of the defect to determine the size or otherwise classify the defect. The differences may be related, but can depend on the size of the defect and its surroundings.

In an embodiment, the defects can be reviewed by the CNN at the speed of image acquisition. Furthermore, the semiconductor manufacturer can skip extra re-detection or review steps after the size determination described herein. This benefits throughput for the semiconductor manufacturer.

Image classification using deep learning methods can be used for defect size measurements. Rather than relying on a set of pre-determined attributes, deep learning uses the information from all pixels in all channels simultaneously, weighing the relations between pixels that best correlate with defect sizes.

The component(s) executed by the processor, can include a deep learning module (e.g., a CNN unit). The deep learning module can have one of the configurations described further herein. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data.

Generally speaking, deep learning (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., a feature to be extracted for reference) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a CNN, can be used for feature analysis. The actual implementation may vary depending on the size of input images, the number of features to be analyzed, and the nature of the problem. Other layers may be included in the deep learning module besides the neural networks disclosed herein.

In an embodiment, the deep learning module is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning module is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning module is configured as a deep generative model. For example, the model may be configured to have a deep learning architecture in that the model may include multiple layers, which perform a number of algorithms or transformations.

In another embodiment, the deep learning module is configured as a neural network. In a further embodiment, the deep learning module may be a deep neural network with a set of weights that model the world according to the data that it has been fed to train it. Neural networks can be generally defined as a computational approach, based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically comprise multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning module used for the semiconductor inspection applications disclosed herein is configured as an AlexNet. For example, an AlexNet includes a number of convolutional layers (e.g., 5) followed by a number of fully connected layers (e.g., 3) that are, in combination, configured and trained to analyze features for determining rotation and translation offsets. In another such embodiment, the deep learning module used for the semiconductor inspection applications disclosed herein is configured as a GoogleNet. For example, a GoogleNet may include layers such as convolutional, pooling, and fully connected layers such as those described further herein configured and trained to analyze features for determining rotation and translation offsets. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning module used for the semiconductor inspection applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to analyze features for determining rotation and translation offsets. VGG networks also include convolutional layers followed by fully connected layers.

In some such embodiments, the deep learning module used for the semiconductor inspection applications disclosed herein is configured as a deep residual network. For example, like some other networks described herein, a deep residual network may include convolutional layers followed by fully-connected layers, which are, in combination, configured and trained for feature property extraction. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In a further such embodiment, the deep learning module used for the semiconductor inspection applications disclosed herein includes one or more fully connected layers configured for analyzing features for determining rotation and translation offsets. A fully connected layer may be generally defined as a layer in which each of the nodes is connected to each of the nodes in the previous layer. The fully connected layer(s) may perform classification based on the features extracted by convolutional layer(s), which may be configured as described further herein. The fully connected layer(s) are configured for feature selection and classification. In other words, the fully connected layer(s) select features from a feature map and then analyze the input image(s) based on the selected features. The selected features may include all of the features in the feature map (if appropriate) or only some of the features in the feature map.

In some embodiments, the information determined by the deep learning module includes feature properties extracted by the deep learning module. In one such embodiment, the deep learning module includes one or more convolutional layers. The convolutional layer(s) may have any suitable configuration known in the art. In this manner, the deep learning module (or at least a part of the deep learning module) may be configured as a CNN. For example, the deep learning module may be configured as a CNN, which is usually stacks of convolution and pooling layers, to extract local features. The embodiments described herein can take advantage of deep learning concepts such as a CNN to solve the normally intractable representation inversion problem. The deep learning module may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

In general, the deep learning module described herein is a trained deep learning module. For example, the deep learning module may be previously trained by one or more other systems and/or methods. The deep learning module is already generated and trained and then the functionality of the module is determined as described herein, which can then be used to perform one or more additional functions for the deep learning module.

As stated above, although a CNN is used herein to illustrate the architecture of a deep learning system, the present disclosure is not limited to a CNN. Other variants of deep learning architectures may be used in embodiments. For example, Auto-Encoders, DBNs, and RBMs, can be used. Random forests also can be used.

In an example, a CNN with three convolutional layers including pooling and two fully-connected layers was used. However, other number of convolution and fully-connected layers are possible. The output layer is either a classification step, which sorts the defects into various size bins, or a regression step, directly measuring the size of the defect.

Figure 5:
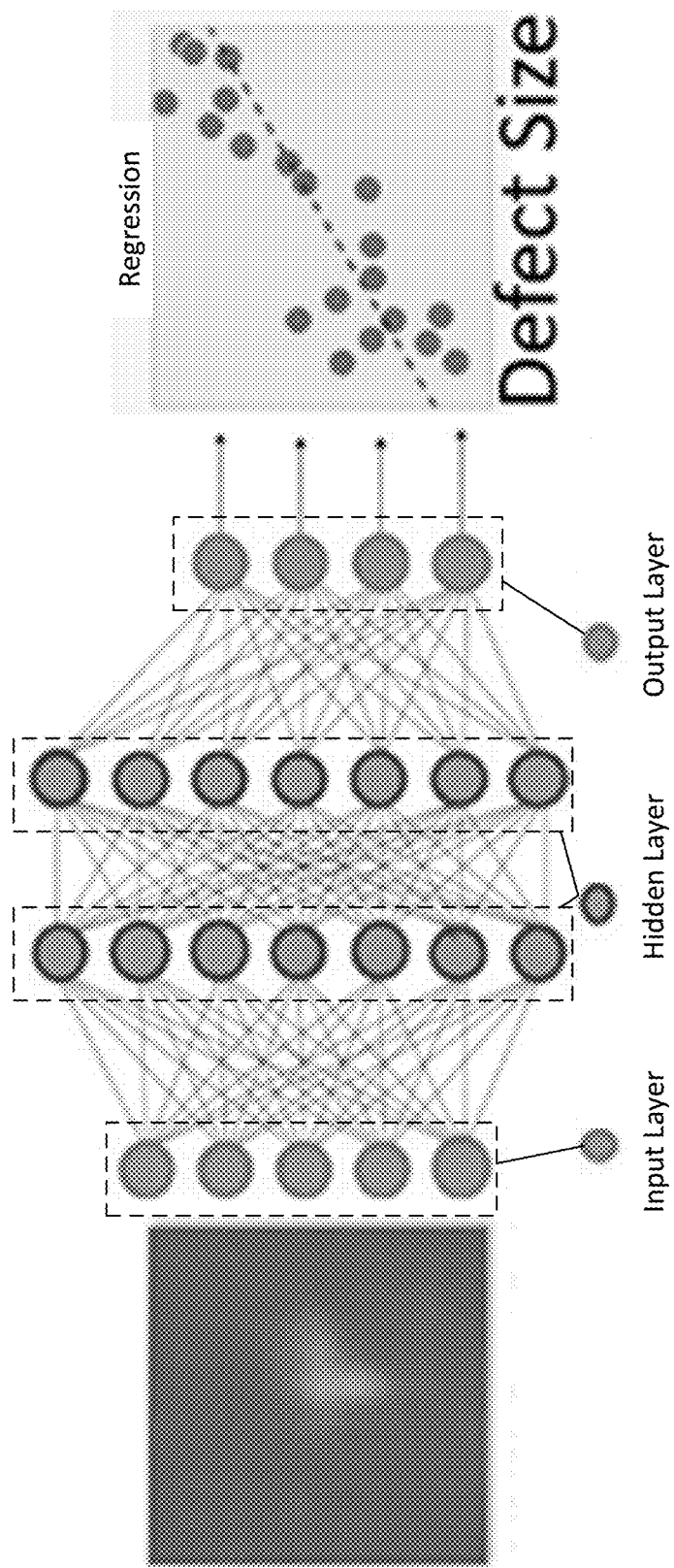
FIG. 5 illustrates an embodiment of a CNN in accordance with the present disclosure.

FIG. 5 shows an exemplary CNN. The pseudo-color RGB defect images are inputs for the neural network. The output is a regression layer measuring defect size. Other CNN architectures besides the examples described herein are possible.

Figure 4:
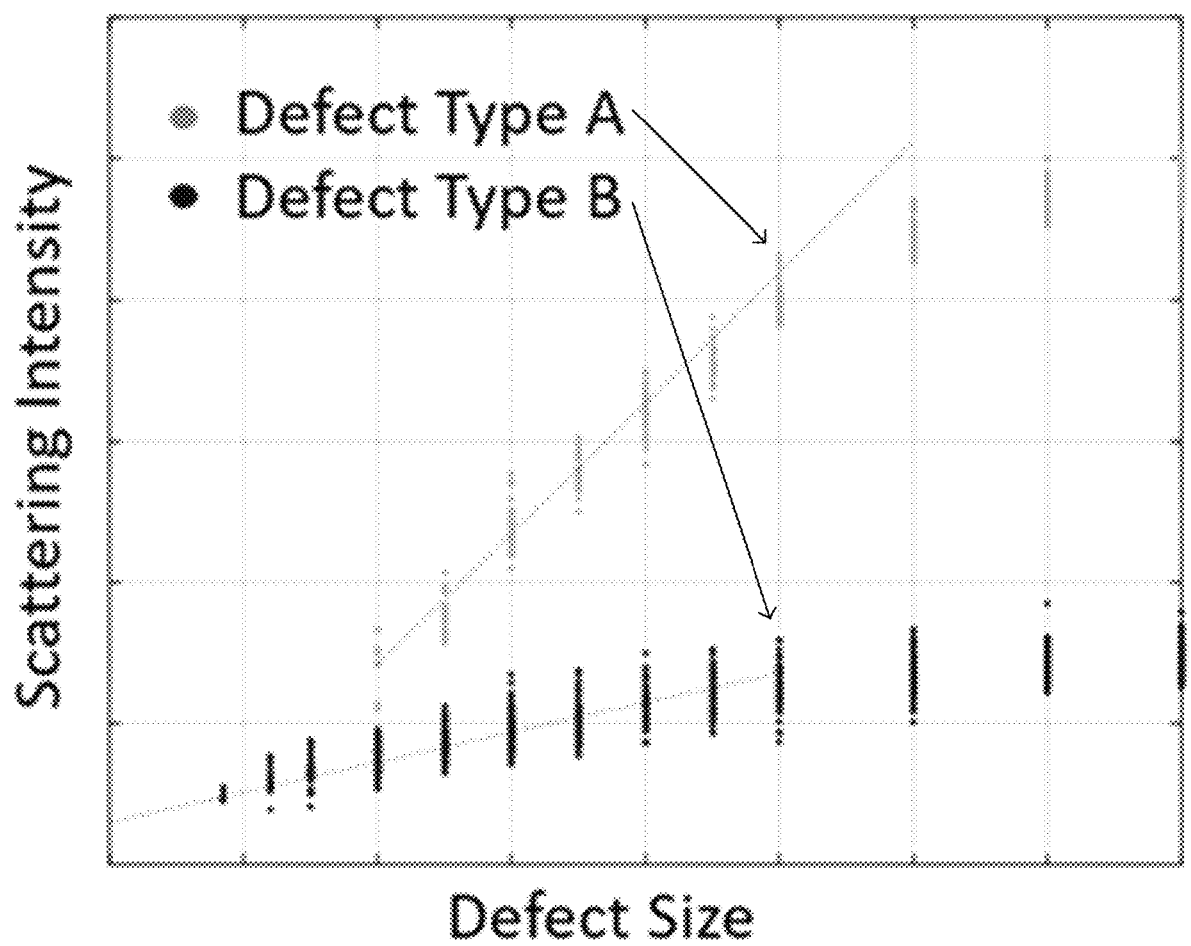
FIG. 4 is a chart showing scattering intensity as a function of defect size.

The defect samples were split into two groups for training the CNN and for validating the results in a typical ratio. Different types of defects scatter the light in different angular intensities with different size scaling dependencies, as indicated in FIG. 4. FIG. 4 shows that scattering intensity as a function of defect size varies for different defect types, such as voids or bridges between patterns. The CNN can learn this scattering behavior.

Figure 3:
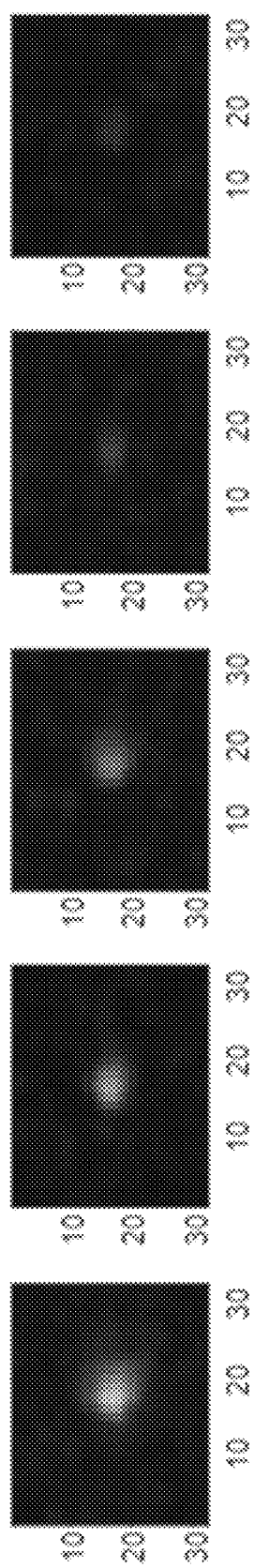
FIG. 3 includes laser-scanning images of defects of decreasing size.

Simpler models that aim to predict the defect sizes can be inaccurate. The CNN can be trained on each defect type separately to learn the scattering behavior of each type. For example, FIG. 3 shows laser-scanning images of defects with decreasing size from left to right. The color or the hue in the images are a manifestation of the difference in intensities in the different channel. The color of the center of the defect changes faintly as the size changes. A CNN can review this color and the location of the defect to assist in making determinations in the embodiments disclosed herein. For example, the CNN may look at the hue of the center of the defect in the RGB image to determine a size of the defect.

Figure 6:
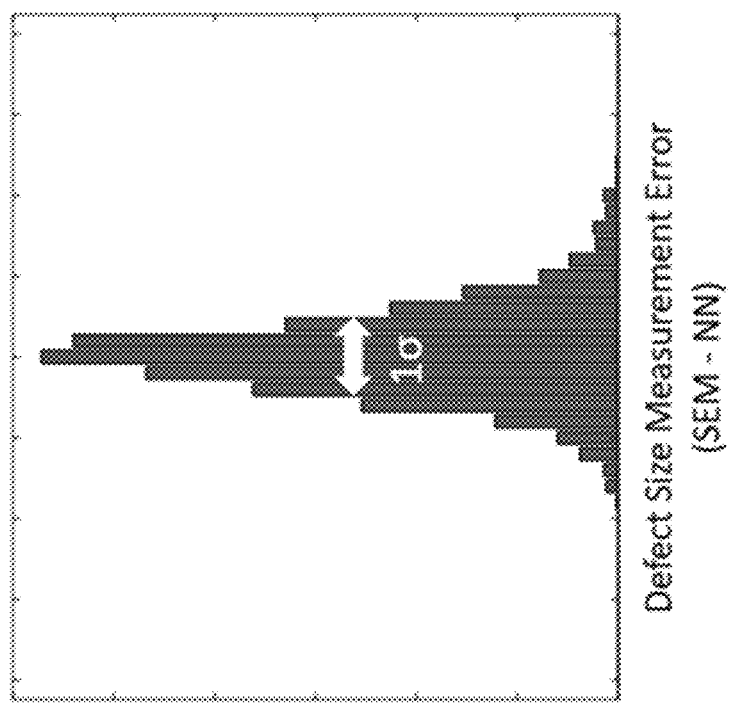
FIG. 6 is a chart showing defect size measured by neural network versus SEM and the corresponding defect size measurement error.
Figure 6:
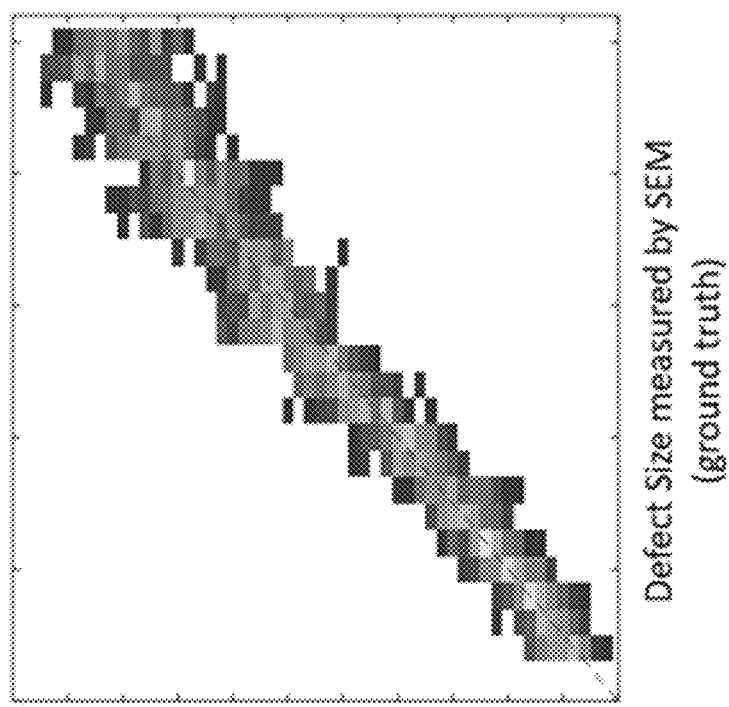

In scatter plots, the measured versus the actual design size of each defect should fall on a diagonal line assuming perfect accuracy of the CNN classifier. The measurement error is the difference between the measured and actual size. The size resolution of the measurement is the sigma of the measurement error distribution, as shown in FIG. 6. The size measurement of the CNN (right) is close to the true size of the defect as measured by a high-resolution SEM tool (left). From the distribution of the measurement errors (SEM-NN size), the size resolution of the method disclosed herein (right) can be derived.

Figure 7:
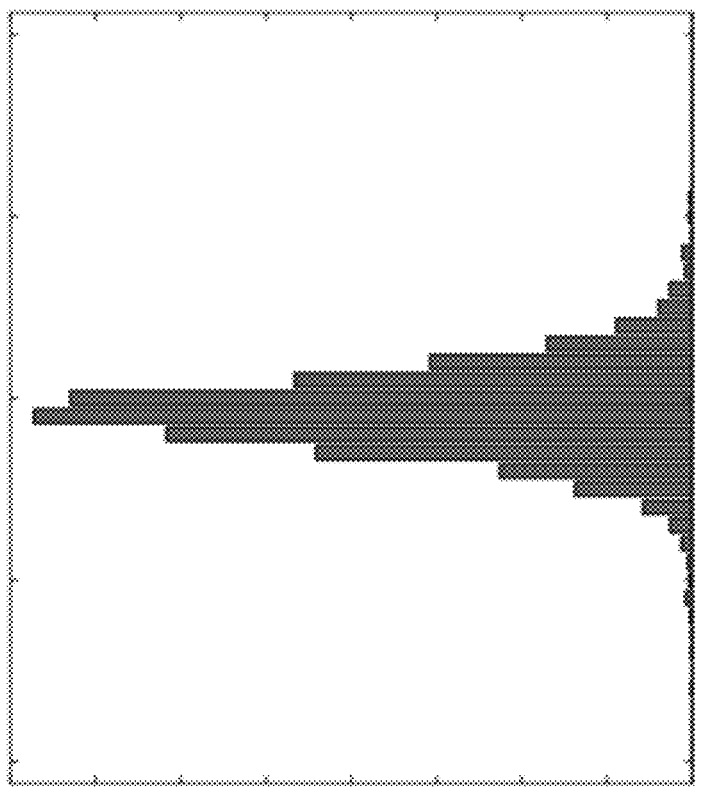
FIG. 7 is a chart showing one-channel resolution and three-channel resolution.
Figure 7:
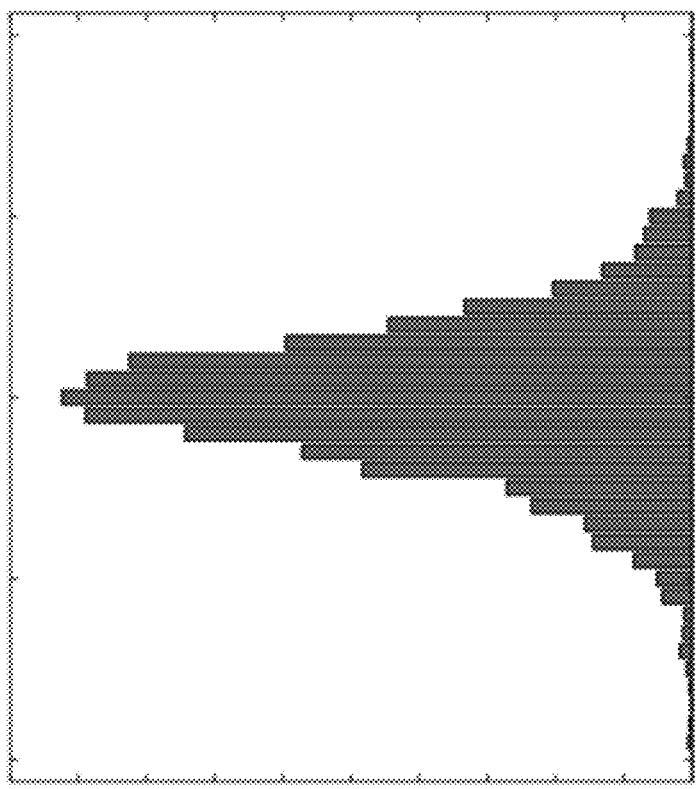

The three detection channels of the laser-scanning tools can be considered equivalent to three separate measurements of the defect. Combining these three images into a single measurement improves the sizing resolution of the embodiments, as shown in FIG. 7. FIG. 7 shows the advantage of a three-channel laser-scanning tool over a single-channel tool. The peak for the three-channel laser-scanning tool narrows, demonstrating better resolution.

An additional embodiment relates to a non-transitory computer-readable medium storing program instructions executable on a controller for performing a computer-implemented method for wafer inspection, as disclosed herein. An electronic data storage unit or other storage medium may contain non-transitory computer-readable medium that includes program instructions executable on the processor 110 of FIG. 1. The computer-implemented method may include any step(s) of any method(s) described herein, including method 200.

In an instance, the non-transitory computer-readable storage medium, comprising one or more programs for executing steps on one or more computing devices. The steps include combining images of a wafer from a plurality of detectors into a pseudo-color RGB image and determining a size of a defect in the pseudo-color RGB image using a CNN unit. The combining can include image overlay. The steps can further include classifying the defect into one of a plurality of size categories using the CNN unit.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a light source configured to generate a beam of light;
at least two detectors configured to receive the beam of light reflected from a wafer, wherein each of the detectors is a different channel; and
a processor in electronic communication with the detectors, wherein the processor is configured to:
assign colors to images of each of the channels of the detectors based on an intensity value of the images, wherein the channels include a red channel, a green channel, and a blue channel;
align the images from the detectors with respect to each other whereby the images correspond to a same location on a surface of the wafer; and
combine the images from the detectors into a pseudo-color RGB image using image overlay or image subtraction; and
a convolutional neural network unit configured to:
receive the pseudo-color RGB image from the processor; and
determine a size of a defect in the pseudo-color RGB image using a defect position within each of the channels and a number of pixels that the defect covers in each of the channels, wherein the size of the defect is less than 1 micron.

2. The system of claim 1, wherein the at least two detectors include three detectors.

3. The system of claim 1, wherein the convolutional neural network unit is further configured to classify the defect into one of a plurality of size categories.

4. The system of claim 1, wherein the light source is a laser.

5. The system of claim 1, wherein the processor is configured to add design images to the pseudo-color RGB image.

6. A method comprising:
receiving a beam of light reflected from a wafer at a plurality of detectors, wherein each of the detectors is a different channel;
assigning, using a processor, colors to images of each of the channels of the detectors based on an intensity value of the images, wherein the channels include a red channel, a green channel, and a blue channel;
aligning, using the processor, the images from the detectors with respect to each other whereby the images correspond to a same location on a surface of the wafer;
combining, using the processor, the images from the detectors into a pseudo-color RGB image using image overlay or image subtraction; and
determining a size of a defect in the pseudo-color RGB image using a convolutional neural network unit that uses a defect position within each of the channels and a number of pixels that the defect covers in each of the channels, wherein the size of the defect is less than 1 micron.

7. The method of claim 6, wherein the plurality of detectors includes three detectors.

8. The method of claim 6, further comprising classifying the defect into one of a plurality of size categories using the convolution neural network unit.

9. The method of claim 6, further comprising generating the beam of light with a laser.

10. The method of claim 6, further comprising adding, using the processor, design images or mask images to the pseudo-color RGB image.

11. A non-transitory computer-readable storage medium, comprising one or more programs for executing the following steps on one or more computing devices:
   assigning colors to images of channels from a plurality of detectors based on an intensity value of the images, wherein each of the detectors is a different one of the channels, and wherein the channels include a red channel, a green channel, and a blue channel;
   aligning the images from the detectors with respect to each other whereby the images correspond to a same location on a surface of the wafer;
   combining the images of a wafer from a plurality of detectors into a pseudo-color RGB image using image overlay or image subtraction; and
   determining a size of a defect in the pseudo-color RGB image using a convolutional neural network unit that uses a defect position within each of the channels and a number of pixels that the defect covers in each of the channels, wherein the size of the defect is less than 1 micron.

12. The non-transitory computer-readable storage medium of claim 11, wherein the steps further include classifying the defect into one of a plurality of size categories using the convolution neural network unit.

13. The non-transitory computer-readable storage medium of claim 11, wherein the plurality of detectors includes three detectors.

14. The non-transitory computer-readable storage medium of claim 11, wherein the steps further include adding design images or mask images to the pseudo-color RGB image.

15. The system of claim 1, wherein the images from the detectors are combined using image overlay.

16. The system of claim 1, wherein the images from the detectors are combined using image subtraction.

17. The system of claim 1, wherein the detectors are non-imaging detectors, and wherein the processor is further configured to generate the images of each of the channels from non-imaging output of the detectors.

18. The system of claim 2, wherein the beam of light for two of the three detectors has an oblique angle of incidence relative to a surface of the wafer.

19. The system of claim 1, wherein the processor is configured to add mask images to the pseudo-color RGB image.

20. The system of claim 1, wherein the convolutional neural network unit configured to determine the size of the defect in the pseudo-color RGB image further using differences in a relative intensity value in each of the channels.

* * * * *